7-16-74 OR 3,824,004

United States Patent [19]

Doi et al.

[11] 3,824,004

[45] July 16, 1974

[54] COLOR SEPARATION PRISM FOR TELEVISION CAMERA

[75] Inventors: Yoshikazu Doi; Toshio Kishikawa, both of Ohmiya, Japan

[73] Assignee: Fuji Shashin Koki Kabushiki Kaisha, Saitama-ken, Japan

[22] Filed: Apr. 26, 1973

[21] Appl. No.: 354,793

Related U.S. Application Data

[63] Continuation of Ser. No. 136,118, April 21, 1971, abandoned.

[30] Foreign Application Priority Data

Apr. 27, 1970 Japan ............................... 45-36072

[52] U.S. Cl. .............................. 350/173, 178/5.4 E

[51] Int. Cl. .......................................... G02b 27/10

[58] Field of Search...... 350/173; 178/5.4 E, 5.4 TC

[56] References Cited

UNITED STATES PATENTS

| | | | |
|---|---|---|---|
| 3,094,911 | 6/1963 | Reiche et al. | 88/1.5 R |
| 3,192,826 | 7/1965 | Papke | 88/1.5 R |
| 3,387,530 | 6/1968 | Ebertz | 88/1.5 R |
| 3,590,145 | 6/1971 | Schneider et al. | 178/5.4 TC |
| 3,610,818 | 10/1971 | Bachmann | 350/173 X |

*Primary Examiner*—David H. Rubin
*Attorney, Agent, or Firm*—Fleit, Gipple & Jacobson

[57] ABSTRACT

A color separation prism having a biased light source in a color television camera. This color separation prism further has a plurality of light reflecting surfaces, whereby the biased light from one light source is projected onto the photoelectric face of a pick up tube of the color television camera from a plurality of locations of the prism.

6 Claims, 9 Drawing Figures

COLOR SEPARATION PRISM FOR TELEVISION CAMERA

This is a continuation of application Ser. No. 136,118, filed Apr. 21, 1971, now abandoned.

BACKGROUND OF THE INVENTION

1. FIELD OF THE INVENTION

This invention relates to a color separation prism in a color television camera, and more particularly to improvements in the color separation prism having a biased light source in a color television camera.

In order to eliminate a residual image formed on a pick up tube of a color television camera, it has been conventionally practiced to introduce a biased light independent of the light from an object, intermediary of the optical system, and to project the same onto the photoelectric face of the pick up tube.

Thus invention concerns improvements in the color separation prism, having a source of such biased light, in a color television camera.

2. DESCRIPTION OF THE PRIOR ART

For obtaining such a biased light as mentioned above, it may be considered to provide intermediary of the lens system of the camera or the light path of the color separation prism a semi-transparent layer for projecting the light from the biased light source onto the photoelectric face of the pick up tube. However, in order to lead a sufficient quantity of biased light onto the photoelectric face by such a semi-transparent layer, the semi-transparent layer is required to have a considerably large reflection factor. This rather results in a decrease of the light quantity reaching the photoelectric face from the object and hence degradation of the performance of the entire camera system.

Thus, it is required to obtain the biased light without resulting in a loss of the light quantity from the object.

SUMMARY OF THE INVENTION

The present invention provides an improved color separation prism for use in a color television camera, which meets the aforesaid requirement.

Namely, the primary object of the present invention is to provide a color separation prism so constructed as to lead a required quality of biased light onto the photoelectric face of a pick up tube, without resulting in a loss of light quantity from an object.

Another object of the invention is to provide a color separation prism so constructed as to project the biased light into all of the three chrominance channel systems of a color television camera, without resulting in a loss of quantity from an object.

Still another object of the invention is to provide a color separation prism so constructed as to irradiate a biased light, with uniform distribution, over the photoelectric face of a pick up tube.

Other objects of the invention will become apparent from the detailed description on an embodiment of the invention, which will be given later.

In order to attain the objects set forth above, according to the present invention one biased light source is provided on the side adjacent the face of incidence of the color separation prism, and the light from said biased light source is led onto the photoelectric face of the pick up tube by way of a plurality of reflecting faces.

DESCRIPTION OF THE PREFERRED EMBODIMENT

Figure 1:
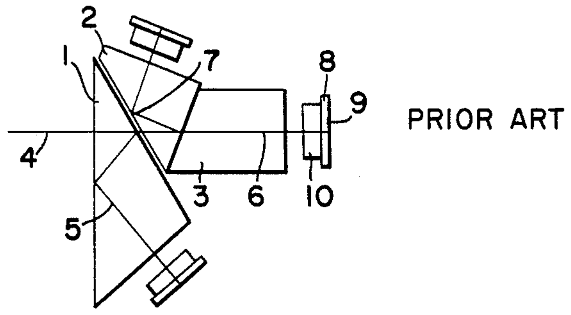
FIG. 1 is a side view showing the construction of the conventional three color separation prism.

FIG. 1 shows one form of the conventional three color separation prism used in a color television camera. The incident light 4 from a taking lens is separated by an optical system composed of prisms 1, 2 and 3, into three color light paths directing towards chrominance channel systems 5, 6 and 7. Each of these lights is focused on the photoelectric face 9 of respective pick up tube through a glass chip 10 and a face plate 8 which are provided for the purpose of avoiding a ghost image and flare.

Figure 2:
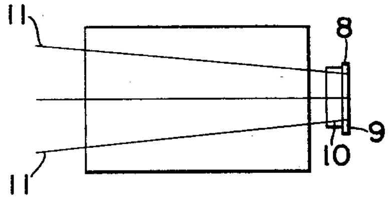
FIG. 2 is a developed view showing the light path in the prism of FIG. 1.

FIG. 2 is a view in a plane perpendicular to the sheet of FIG. 1 through the light paths 4 and 6, and is also a developed view of the chrominance channel system from the light path 4 to 5 and the chrominance channel system from the light path 4 to 7. In FIG. 2, reference numeral 11 designates the necessary portion of the bundle of light from the taking lens to the photoelectric face 9.

In the description herein, the face of the prism near to the viewer's eyes will be called the top of the prism and the face on the opposite side will be called the bottom of the prism, when FIG. 1 is viewed in a direction perpendicular to the sheet of the drawing. In general, this form of prism is assembled using the bottom thereof as reference plane and the assembled prism is set, in most cases, on a vertical partition wall in the camera, at the bottom thereof. Therefore, in the set position the top and bottom of the prism face sidewards and are called also as sides of the prism herein.

Figure 3:
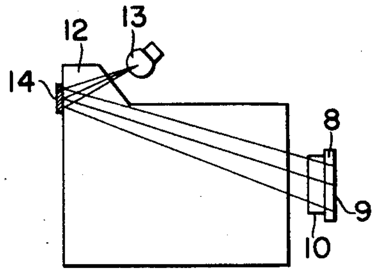
FIG. 3 is a diagrammatical view illustrating the principle of a three color separation prism having a biased light source.

With reference now to FIG. 1, the top of the prism 1 is deformed at the portion closer to the inlet of the incident light as at 12 in FIG. 3 and a portion 14 of the incident face of the prism 1 is used as a reflecting surface or diffused surface. Of course, the reflecting surface 14 must be located in a position not to block the incident light bundle 11 shown in FIG. 2. A biased light source 13 is disposed on the side adjacent the projection 12. With such arrangement, the biased light from the biased light source 13 is reflected on the reflecting surface 14 and gives the necessary illumination to the photoelectric face 9 of the pick up tube.

It will be understood that by projecting the biased light into the photoelectric tube 9 in the manner described, the necessary quantity of biased light can be simultaneously given to all of the three chrominance channel systems without causing a loss of the light quantity from the taking lens. Where the biased light is not required by one or two of the three chrominance channel systems, the biased light to these system or systems can be blocked by a suitable color filter provided at the biased light source, since the three color separation prism normally has a dichroic mirror.

Figure 4:
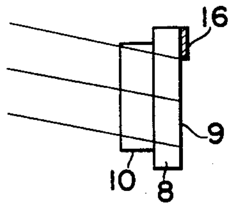
FIG. 4 is an enlarged side view showing the details of the face plate and the chip.

In this method, however, since the biased light is projected onto the photoelectric face, not perpendicularly but obliquely as shown in FIGS. 3 or 4, the upper portion of the photoelectric face 9 becomes bright and the lower portion thereof becomes dark. Furthermore, since the chip 10 has a considerably large thickness as shown in FIG. 4, a shade appears at a portion 16 of the photoelectric face 9 when the biased light is projected obliquely. If the diameter of the chip 10 is sufficiently large as compared with the effective area of the photoelectric face 9, such shade would pose no problem. In practice, however, there is no room to increase the size of the chip 10 and the shade at the portion 16 comes into the effective area of the photoelectric face 9.

Figure 5:
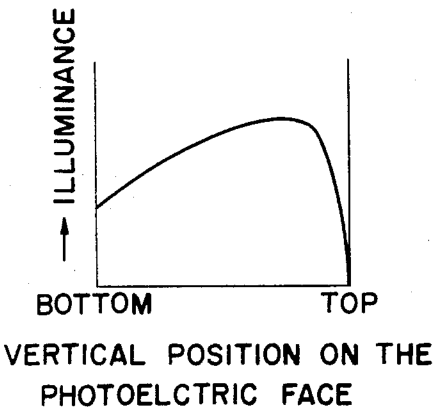
FIG. 5 is a graph showing the illumination distribution of the biased light in case of the prism shown in FIG. 3.

These two problems may be solved to some extent by providing at the portion 14 of FIG. 3, not a complete reflector but a diffused surface which provides irregular reflection and further by increasing the area of said surface 14 to the extent not to interfere with the light bundle 11 (FIG. 2) from the taking lens, but cannot be solved completely. The result is that the illuminance progressively increases upwards but suddenly decreases at the top end due to the shade 10 as shown in FIG. 5 and as stated previously.

This problem can be solved by projecting the biased light, not from one side but from both sides of the color separation prism.

Figure 6:
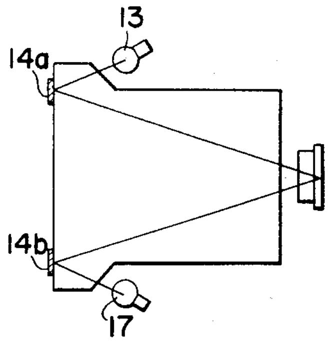
FIG. 6 is a diagrammatical view showing a prism having biased light sources on both sides thereof.
Figure 7:
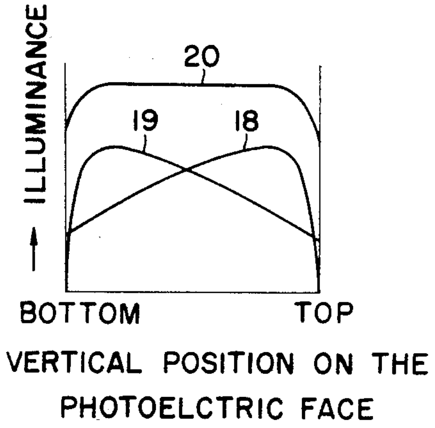
FIG. 7 is a graph showing the illumination distribution of the biased light in case of the prism shown in FIG. 6.

Such arrangement is shown in FIG. 6, in which a biased light source 17 is disposed on the bottom side of the prism in addition to the biased light source 13. In this case, as may be seen from the illumination distribution of FIG. 7, the illumination distribution 20 obtained by the simultaneous use of both light sources extends evenly over the entire area of the photoelectric face as contrasted to those obtainable by the use of the biased light source 13 only and by the use of the biased light source 17 only.

However, the bottom of the color separation prism is generally used as a reference plane for the precision and assembly of the prism assembly. For this reason, it is in most cases impractical to form the prism in a complicated shape for the irradiation of the biased light and the use of such prism also makes it difficult to mount the biased light source or sources.

Figure 8:
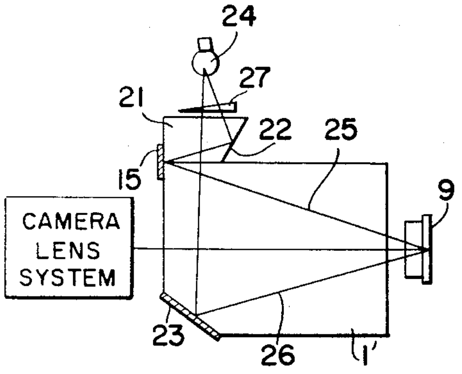
FIG. 8 is a view showing an embodiment of the prism with biased light source according to the invention.
Figure 9:
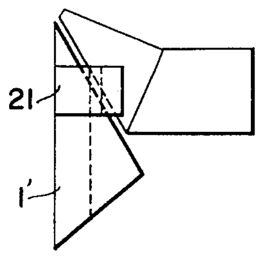
FIG. 9 is a side view showing in an enlarged scale a portion of the prism according to the invention.

In the present invention, such problem can be solved by forming the prism in the shape shown in FIGS. 8 and 9.

FIG. 8 shows the color separation prism of the instant invention and is a developed view, similar to FIGS. 2, 3 and 6, of the prism which constitutes one of the three chrominance channel systems. FIG. 9 is a side view, similar to FIG. 1, of the entire prism as viewed from one side thereof. A small prism element 21 is bonded to the top of a prism element 1′ and a face 22 thereof is used as a reflecting surface. Further, at the portion of the prism element 1′ which receives the light from the reflecting surface 22, is provided a reflecting surface or diffused surface (as indicated at 15 in FIG. 8). Furthermore, the edge of the prism element 1′ defined by the bottom and the face of incidence is worked to form a beveled surface 23 which provides a reflecting surface or diffused surface. The light bundle from a biased or auxiliary light source 24 partially proceeds along a light path 25, upon being reflected on the reflecting surface 22 and the reflecting surface or diffused surface 15, and illuminates the photoelectric face 9 of the pick up tube. Another light bundle from the biased light source 24 proceeds along a light path 26 upon being reflected on the reflecting surface or diffused surface 23 and illuminates the photoelectric face 9 in a different direction from the light path 25. It will be understood that the illumination distribution of FIG. 7 can be obtained similar to the case of FIG. 6, by the irradiation of the light in these two directions.

It may be considered that the uniformity of illumination distribution is impaired by the length difference between the light paths 25 and 26 from the light source to the photoelectric surface. In order to avoid such disadvantage, a wedge-shaped ND filter 27 may be provided between the light source 24 and the small prism element 21, so as to make even the luminance of the light path 25 and that of the light path 26. A similar effect can be obtained by adjustably varying the area of the reflecting or diffused surface 15 relative to the reflecting or diffused surface 23, instead of using the ND filter.

It should be understood that the present invention can optionally be applied to color television cameras of the type comprising a prism in their optical systems, wherein a biased light source is required, and the application thereof is not restricted only to the three color separation prism described and illustrated herein.

We claim:

1. In a color separation prism assembly for use in a color television camera having an image pick up lens and a plurality of primary color pick up tubes for receiving primary light beams separated by said prism, the prism assembly having a top, a bottom opposite said top, a light beam input face located on a side of said prism assembly for receiving an input light beam from the image pick up lens of the camera, a plurality of primary color light beam output faces, one primary color light beam output face for each of the primary color light beams separated in said prism assembly, and at least one beam splitting surface therein for splitting the input light beam into a plurality of primary color light beams, said separation prism assembly further including an auxiliary illumination source disposed above the top of said prism assembly adjacent the light beam input face of the assembly so that light from the auxiliary illumination source passes into said prism assembly through its top and is reflected at the inside of said light beam input face into the interior of said prism assembly and to at least one of the primary color light beam output faces, the improvement comprising: first reflector means at the bottom of said prism assembly adjacent said light beam input face for reflecting at least a portion of the light passing from said auxiliary illumination source into the interior of the prism assembly and to at least one of the primary color light beam output faces, and second reflector means at the top of said prism assembly for reflecting at least a portion of the light passing from said auxiliary illumination source into the interior of the prism assembly and to the said at least one of the primary color light beam output faces, the light reflected by said first and second reflector means reaching the said primary color light beam output faces from opposite directions and in paths different from those of said primary light beams such that the total amount of light from the auxiliary illumination source reaching the primary color pick-up tubes impinges upon the primary color pick-up tubes in a substantially even and uniform pattern.

2. A color separation assembly as in claim 1 wherein said prism assembly includes two beam splitting surfaces adapted to split the light beam input into three primary color light beams and to direct each primary color light beam to its respective primary color output face, said assembly further including three primary light beam output faces positioned on the sides of the prism assembly.

3. Apparatus according to claim 1 wherein the bottom surface of said prism assembly and the light beam input face of said prism assembly are connected by a beveled face defining said first reflector and adapted to reflect light impinging thereon towards at least one of the primary light beam output faces.

4. The prism assembly as in claim 3 wherein only a small portion of the light beam input face is adapted to reflect auxiliary light impinging thereon from the interior of the prism assembly, said portion positioned so as to allow the incident light from the camera input lens system to pass into the interior of said prism assembly and impinge upon said beam splitting surface, said portion and said beveled face being diffused surfaces.

5. A prism assembly as in claim 4 wherein said second reflector is a second prism integral with said top of the prism assembly; said auxiliary illumination source being positioned above said second prism so that a portion of the light generated in said auxiliary illumination source will pass through said second prism into said prism assembly and towards the bottom of said prism, while another portion of the light generated in the auxiliary illumination source will pass through said second prism towards the inside of said light beam input face.

6. A prism assembly as in claim 5 wherein said color separation prism assembly and said second prism are so shaped that:

a. the light path of light from said auxiliary illumination source reflected off the inside of said light beam input face and traveling to at least one of said light beam output faces, and
b. the light path of light from said auxiliary illumination source reflected off said beveled face and traveling to said at least one of said light beam output faces are equidistant.

* * * * *